(12) United States Patent
Chu

(10) Patent No.: US 8,111,355 B2
(45) Date of Patent: Feb. 7, 2012

(54) POLYMER-DISPERSED LIQUID CRYSTAL TRANSFLECTIVE LCD AND METHOD FOR DESIGNING THE SAME

(75) Inventor: Kuei-Lin Chu, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 644 days.

(21) Appl. No.: 12/325,278

(22) Filed: Dec. 1, 2008

(65) Prior Publication Data

US 2009/0219474 A1 Sep. 3, 2009

(30) Foreign Application Priority Data

Feb. 29, 2008 (CN) .......................... 2008 1 0300426

(51) Int. Cl.
*G02F 1/1333* (2006.01)
*G02F 1/335* (2006.01)
(52) U.S. Cl. .................. 349/93; 349/92; 349/114
(58) Field of Classification Search .................. 349/92, 349/93, 114
See application file for complete search history.

(56) References Cited

U.S. PATENT DOCUMENTS

| 7,588,805 | B2 * | 9/2009 | Lin et al. .......................... 428/1.1 |
| 2002/0196390 | A1 * | 12/2002 | Penterman et al. ............. 349/73 |
| 2004/0169790 | A1 * | 9/2004 | Inoue et al. ...................... 349/93 |
| 2006/0023146 | A1 * | 2/2006 | Yang et al. ..................... 349/114 |
| 2007/0216830 | A1 * | 9/2007 | Hoshino et al. ................. 349/86 |

FOREIGN PATENT DOCUMENTS

| CN | 1271426 A | 10/2000 |
| CN | 1928647 A | 3/2007 |

OTHER PUBLICATIONS

Ma et al., the Periodical "The Prepare and Study of Polymer Network Stabilized Liquid Crystal Film," Chinese Journal of Light Scattering, Published on Jan. 2005, vol. 16, No. 4, China.

* cited by examiner

*Primary Examiner* — Michael Caley
(74) *Attorney, Agent, or Firm* — Altis Law Group, Inc.

(57) ABSTRACT

A method for designing a polymer-dispersed liquid crystal (PDLC) transflective liquid crystal display (LCD) is provided. The method includes mixing liquid crystal (LC) molecules and polymer monomers to obtain a mixture. The method further includes injecting the mixture into an LC layer of a transflective LCD in a vacuum. And then polymer dispersed LC can be generated. The generated polymer dispersed LC and the transflective LCD can form a PDLC transflective LCD.

20 Claims, 12 Drawing Sheets

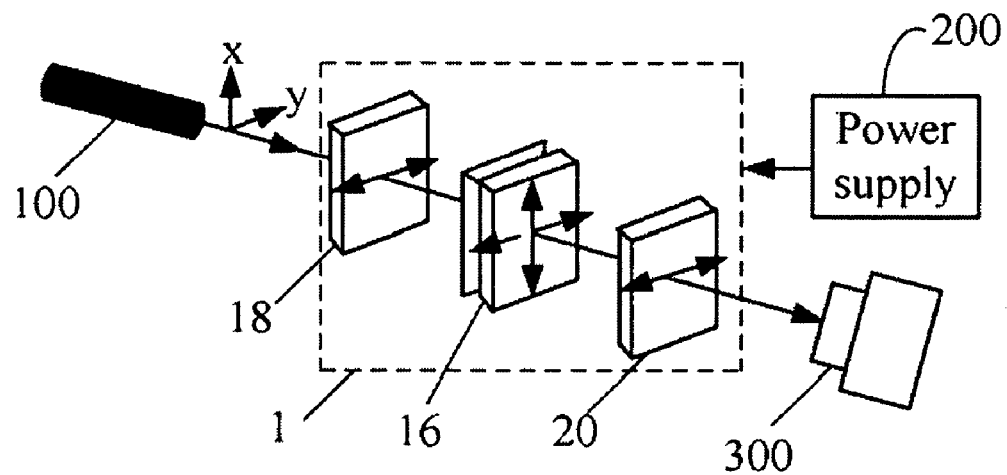
FIG. 4-1
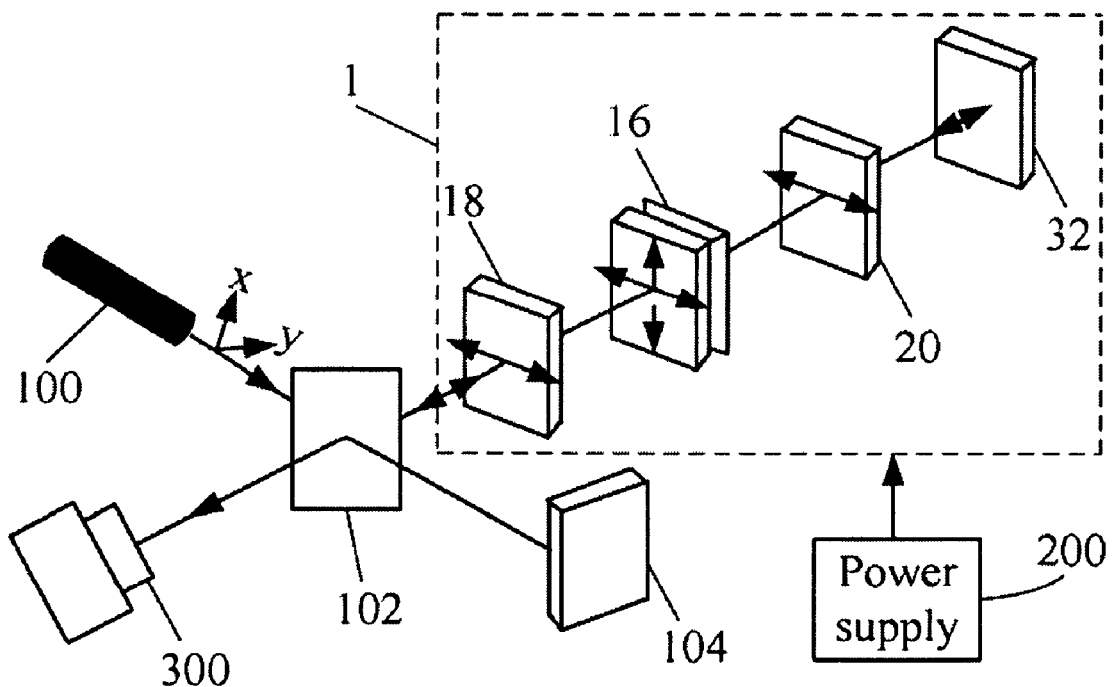
FIG. 4-2
FIG. 4

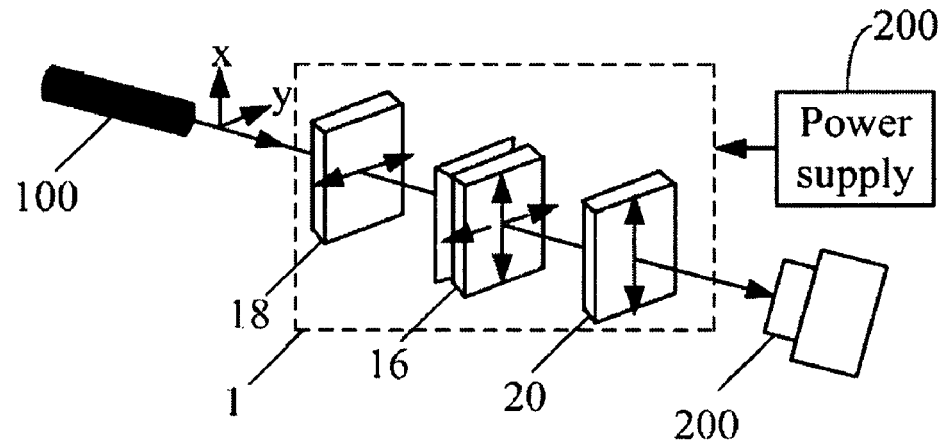
FIG. 9-1
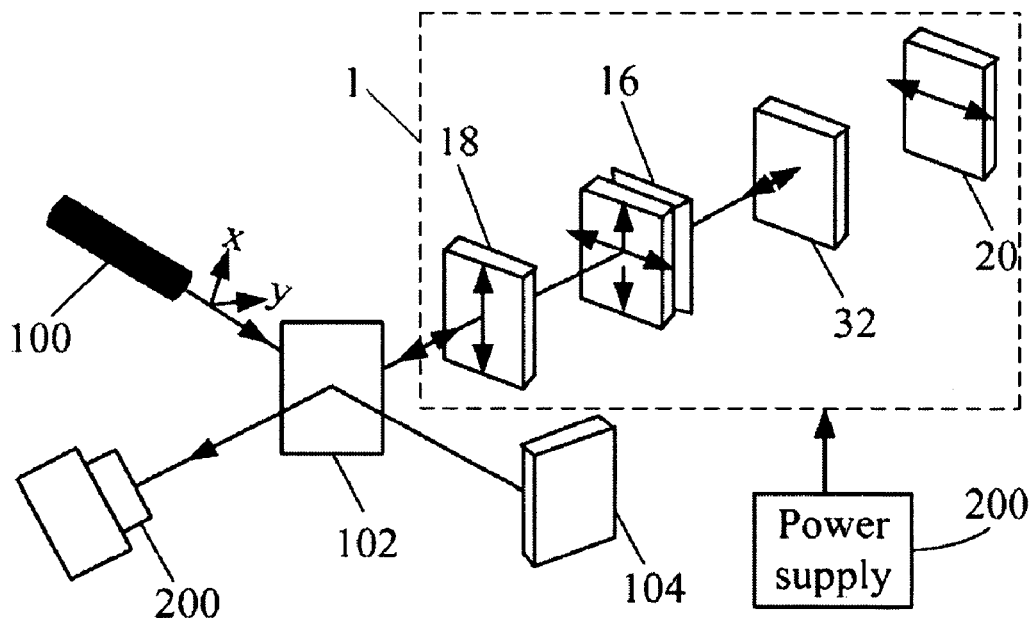
FIG. 9-2
FIG. 9

//PATENT

POLYMER-DISPERSED LIQUID CRYSTAL TRANSFLECTIVE LCD AND METHOD FOR DESIGNING THE SAME

BACKGROUND

1. Field of the Invention

Embodiments of the present disclosure relate to the field of designing liquid crystal displays (LCDs), and more particularly to a method for designing a polymer-dispersed liquid crystal (PDLC) transflective LCD.

2. Description of Related Art

Transmissive liquid crystal displays (LCDs) have been widely used in electronic devices, such as computers, high-definition televisions (HDTVs), mobile devices and so on. The most commonly used transmissive 90 degree twisted-nematic (TN) LCDs exhibit a high contrast ratio due to a self phase compensation effect of orthogonal boundary layers in a voltage-on state. However, a major drawback of a transmissive LCD is that the backlight source needs to be kept on all the time as long as the LCD is in use. Moreover, an image of the transmissive LCD is easily washed out by a strong ambient light such as direct sunlight. Reflective LCDs, on the other hand, have no built-in backlight source. Instead, reflective LCDs utilize an ambient light for displaying images. In comparison to transmissive LCDs, reflective LCDs have advantages in lower power consumption, lighter weight, and better outdoor readability. However, a reflective LCD relies on ambient light and thus is not suited towards low or dark ambient conditions.

To overcome the drawbacks and take advantages of both of the reflective LCDs and transmissive LCDs, transflective LCDs have been developed. The transflective LCD can display images in both transmissive mode (T-mode) and reflective mode (R-mode) simultaneously or independently. Under bright ambient lights, the backlight of the transflective LCD can be turned off to save power and the transflective LCD operates in the R-mode only. Under dark ambient lights, the backlight is turned on for illumination and the transflective LCD works in the T-mode. In the low-to-medium ambient surroundings, the backlight is still necessary. Since the transflective LCD consists of both T-mode and R-mode, two different phase retardations exist. Thus the transflective LCD has a lower optical performance.

Therefore, what is needed is a method for designing a transflective LCD, in order to control a transmissivity of the transflective LCD and enhance an optical performance of the transflective LCD.

BRIEF DESCRIPTION OF THE DRAWINGS

FIG. 4-1 and FIG. 4-2 show a schematic diagram of one embodiment of a measuring system for measuring the PDLC transflective LCD in each of FIG. 2 and FIG. 3;

FIG. 9-1 and FIG. 9-2 show a schematic diagram of one embodiment of a measuring system for measuring the PDLC transflective LCD in each of FIG. 7 and FIG. 8.

DETAILED DESCRIPTION OF CERTAIN INVENTIVE EMBODIMENTS

Figure 1:
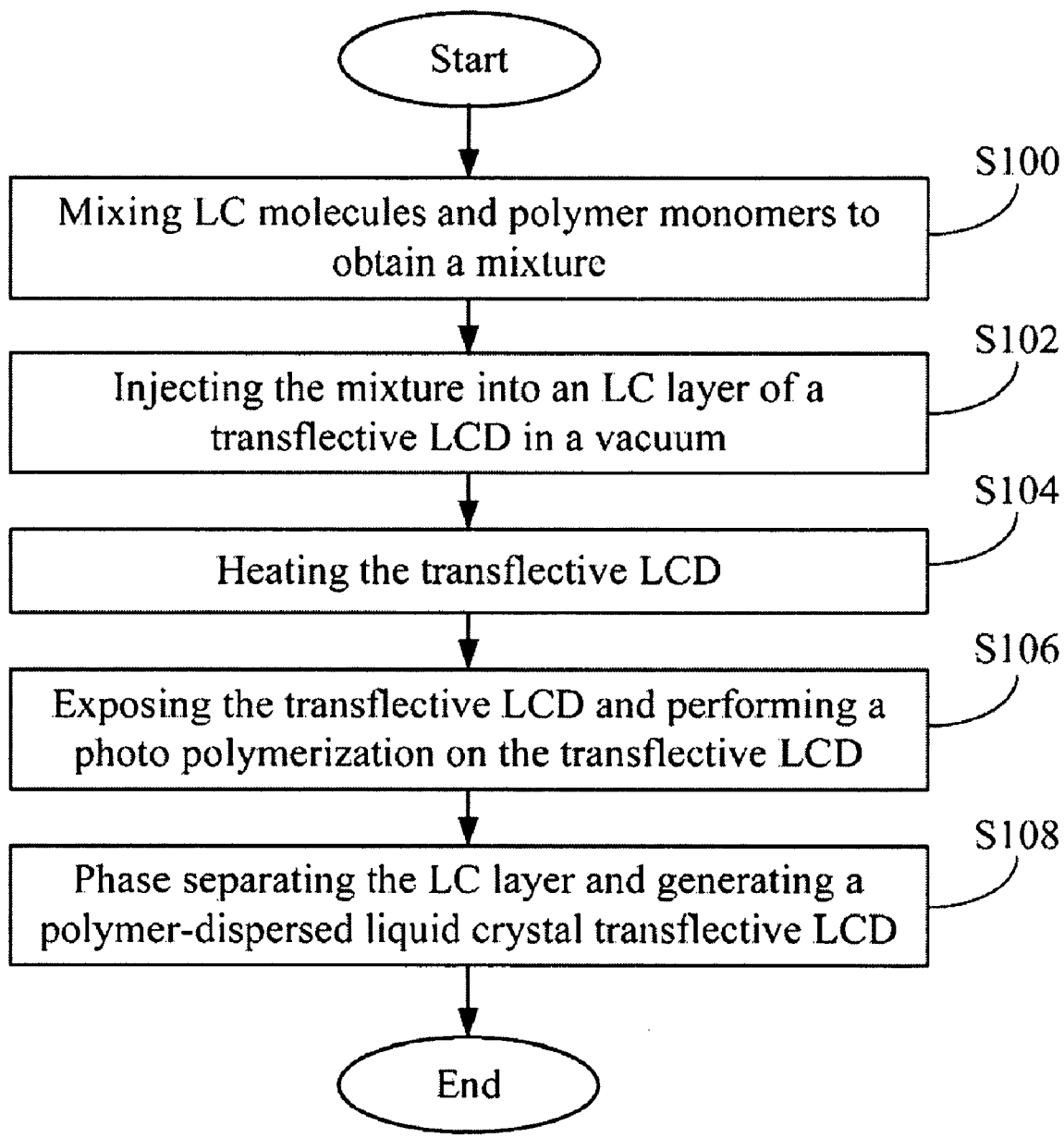
FIG. 1 is a flowchart of one embodiment of a method for designing a polymer-dispersed liquid crystal (PDLC) transflective LCD.

The components in the drawings are not necessarily drawn to scale, the emphasis instead being placed upon clearly illustrating the principles of at least one embodiment. In the drawings, like reference numerals designate corresponding parts throughout the various views.

FIG. 1 is a flowchart of one embodiment of a method for designing a polymer-dispersed liquid crystal (PDLC) transflective LCD. The PDLC is a solid state display device that has relatively good electro-optical properties, which are expected to enter into new display and light control applications. Depending on the embodiment, additional blocks may be added, others removed, and the ordering of the blocks may be changed.

With reference to FIGS. 1-3, 7-8, in block S100, a mixture 14 is obtained by mixing liquid crystal (LC) molecules and polymer monomers. In one embodiment, the LC molecules can be twisted nematic (TN) LCs. The polymer monomers exhibit optical scattering characteristics, and the TN-LCs exhibit adiabatic following characteristics. In the present embodiment, as an example, the weight percentage (wt %) of the polymer monomers may be between about 3 wt % to about 5 wt %. Thus, the mixture 14 includes both optical scattering and adiabatic following characteristics. It may be understood that these values may depend on a desired reflectivity and a transmissivity of the mixture 14.

In block S102, the mixture 14 is injected into an LC layer 16 of a transflective LCD in a vacuum, and the mixture 14 is homogeneously aligned in the LC layer 16. Thus, the transflective LCD with the mixture has optical scattering and adiabatic following characteristics.

In one embodiment, the transflective LCD further includes two glass substrates 10 and 12, a top polarizer 18, a bottom polarizer 20, a backlight 22, a top indium tin oxide (ITO) film 24, a bottom ITO film 26, two alignment layers 28 and 30, and a reflector 32. Ambient light 38 may hit a first surface of the top polarizer 18 at one or more incident angles as will be further explained in greater detail below.

In block S104, the transflective LCD is heated to a predetermined temperature. In the embodiment, the predetermined temperature can be, but not limited to, about 60 degrees centigrade.

In block S106, an exposure machine emits ultraviolet (UV) lights to expose the transflective LCD and a photo polymerization is performed on the transflective LCD using the reflector 32. During the exposure, the UV lights may hit the first surface of the top polarizer 18 at one or more incident angles first, and then the reflector 32 reflects the UV lights onto the mixture 14 again so as to form a polymer from the mixture 14. The process of forming the polymer from the mixture 14 is known as photo polymerization.

In the embodiment, the UV lights are unpolarized lights, and are used to expose the transflective LCD for a period of time, for example, the period of time may be about fifteen minutes. A wavelength of each of the UV lights is between about 345 nanometers (nm) to about 365 nm, and an optical intensity of each of the UV lights is between about 3.5 mW/cm$^2$ to about 12 mW/cm$^2$.

In block S108, a PDLC layer is generated by phase separating the LC layer 16 of the transflective LCD, and the PDLC layer with the transflective LCD may form a PDLC transflective LCD. In the embodiment, the PDLC transflective LCD is a single cell gap transflective LCD.

In the embodiment, the polymer monomers have three features: a non-chemical interaction is generated after the polymer monomers are mixed with the LC molecules, namely no new materials are generated through a chemical process, the polymer monomers and the LC molecules are homogeneously mixed together only; a refractive index of the polymer monomers is different from a refractive index of the LC molecules; and the polymer monomers are capable of being separated from the LC molecules after the transflective LCD absorbs the UV lights.

During the absorption of the UV lights, as shown in block S106, the transflective LCD with the mixture does not need a curing voltage, and the reflector 32 can be located in either of an outer part of the bottom polarizer 20 or an inner part of the bottom polarizer 20.

Figure 2:
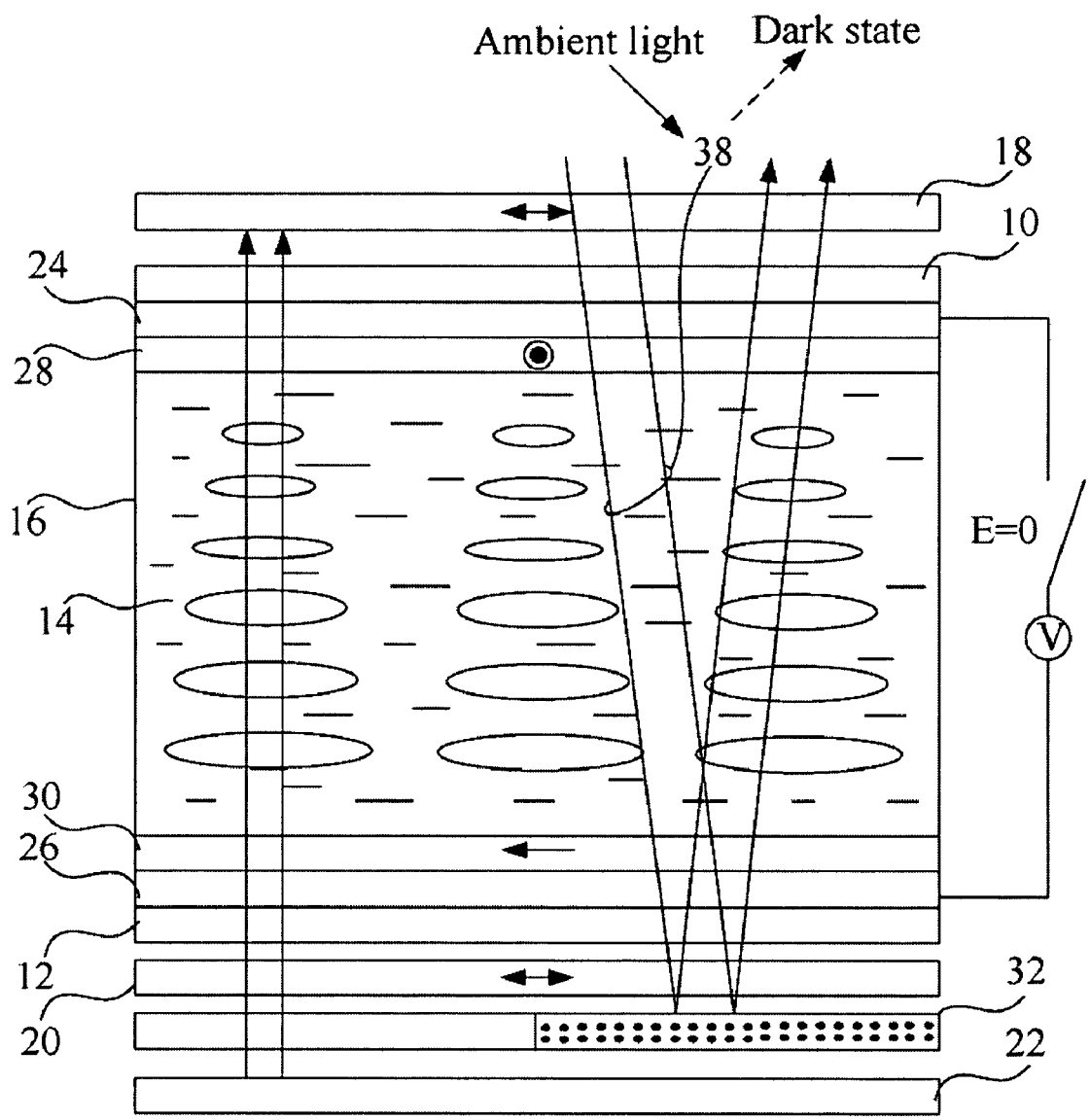
FIG. 2 is a generalized section diagram of one embodiment of the PDLC transflective LCD in a normally black (NB) mode without an applied voltage.
Figure 3:
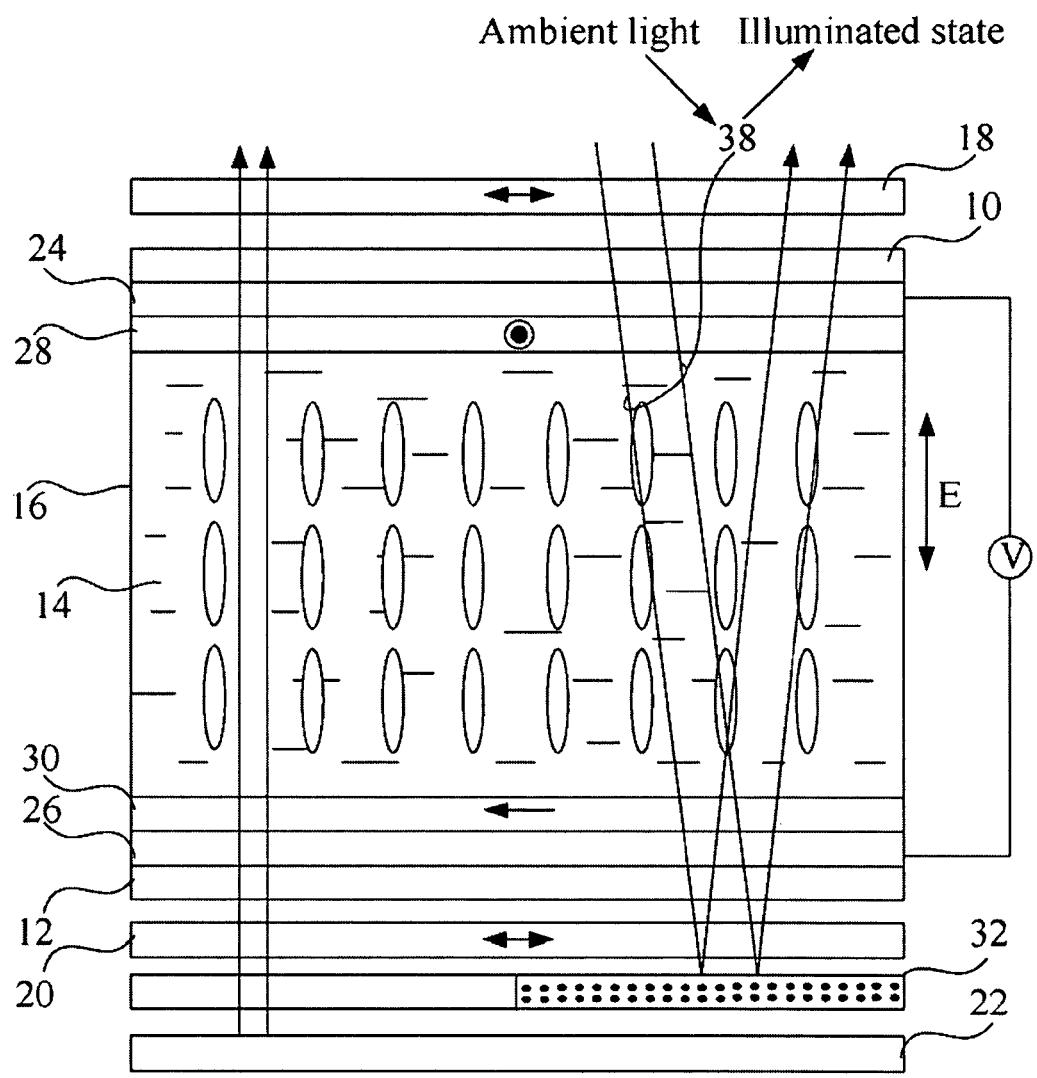
FIG. 3 is a generalized section diagram of one embodiment of the PDLC transflective LCD in the NB mode with the applied voltage.
Figure 7:
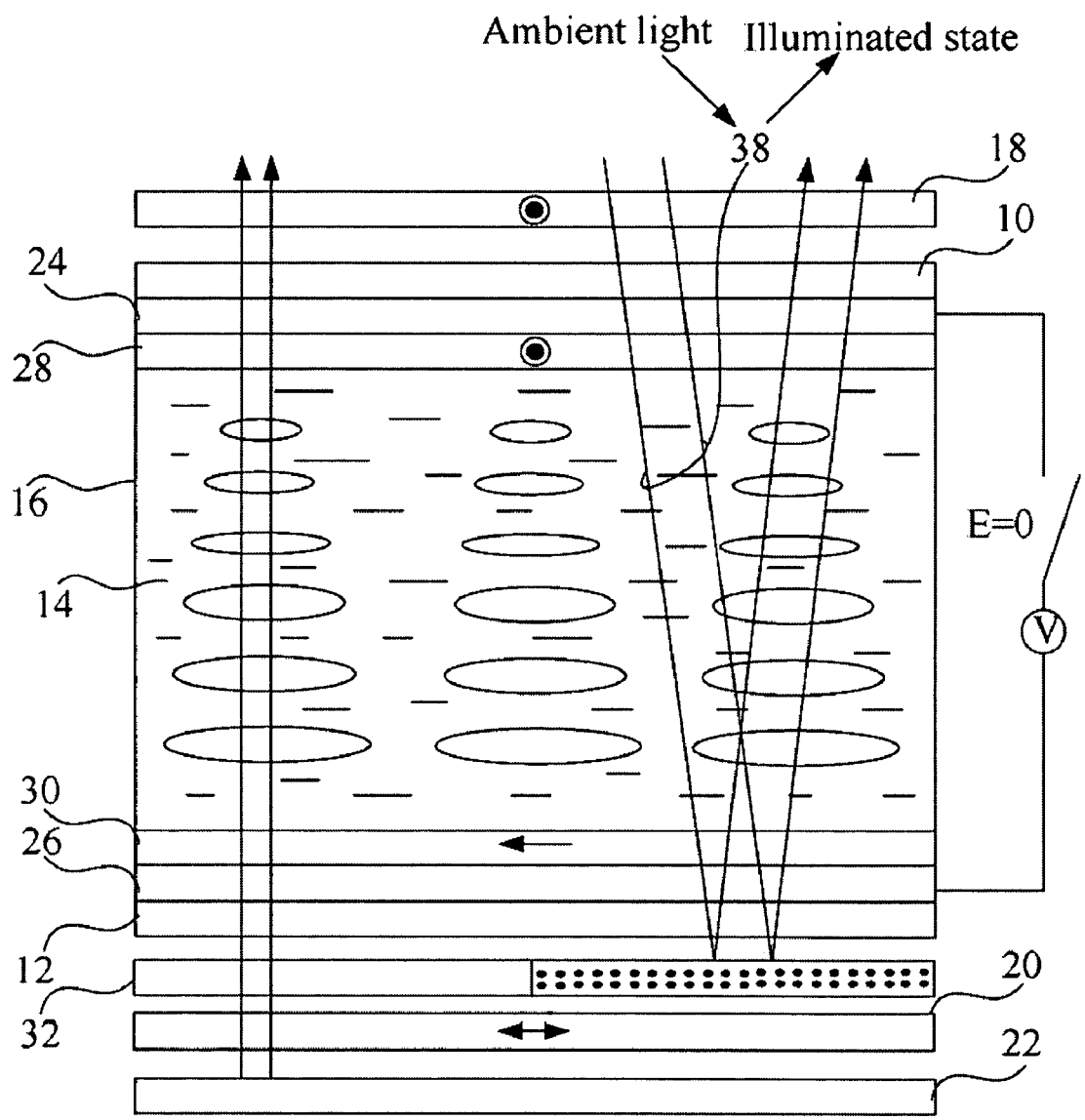
FIG. 7 is a generalized section diagram of one embodiment of the PDLC transflective LCD in a normally white (NW) mode without the applied voltage.
Figure 8:
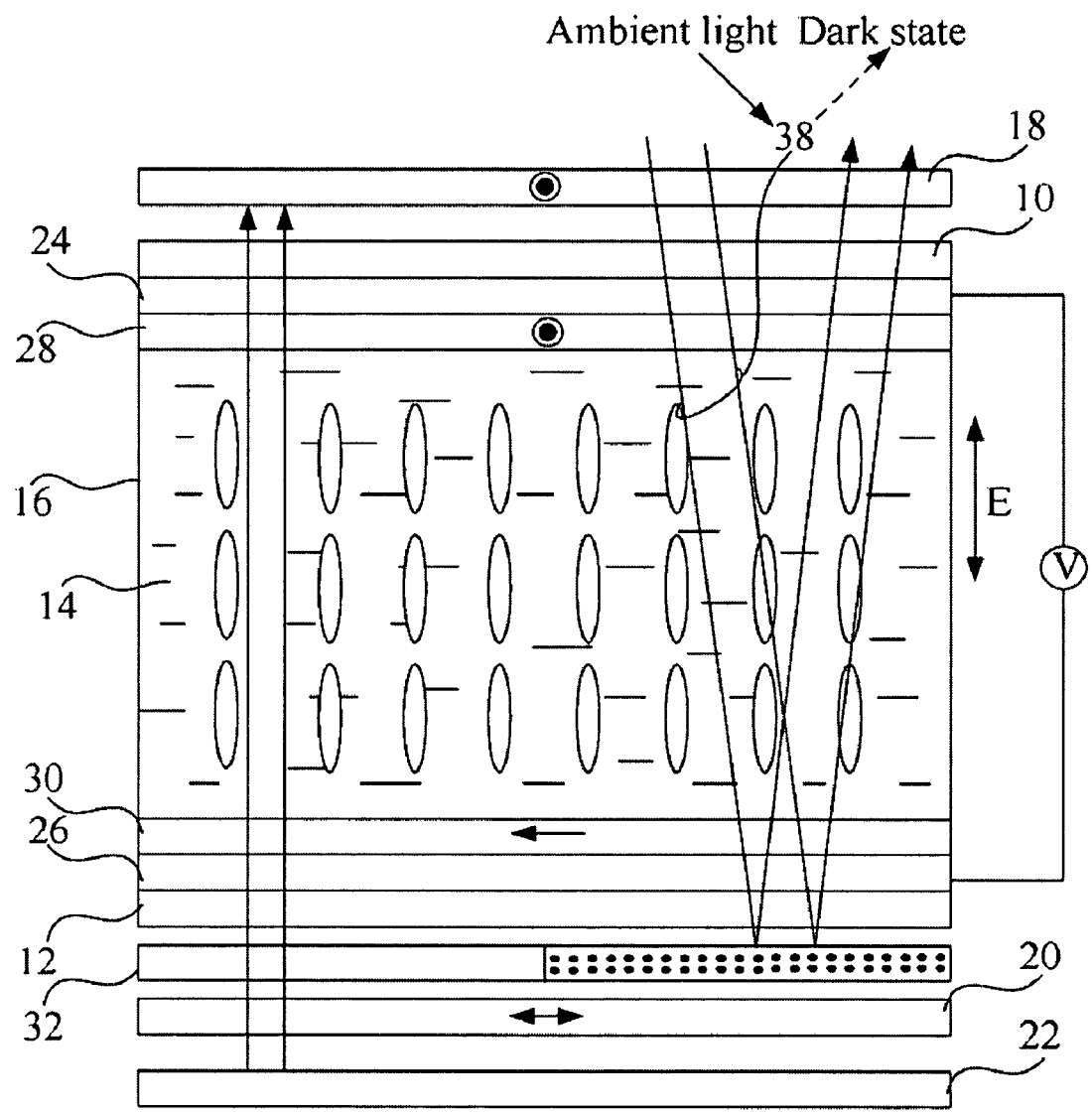
FIG. 8 is a generalized section diagram of one embodiment of the PDLC transflective LCD in the NW mode with the applied voltage.

When the reflector 32 is located in the outer part of the bottom polarizer 20, as illustrated in FIG. 2 and FIG. 3, the top polarizer 18 is parallel to the bottom polarizer 20, and the PDLC transflective LCD is in a normally black (NB) mode. When the reflector 32 is located in the inner part of the bottom polarizer 20, as illustrated in FIG. 7 and FIG. 8, a circle with a black dot in the middle is for showing that the top polarizer 18 is perpendicular to the bottom polarizer 20, and the PDLC transflective LCD is in a normally white (NW) mode. That is, through the method of FIG. 1, two display modes of the PDLC transflective LCD can be designed: the NB mode and the NW mode.

With reference to FIG. 2 and FIG. 3, which show a generalized section diagram of one embodiment of the PDLC transflective LCD in the NB mode. The top polarizer 18 is parallel to the bottom polarizer 20, and the reflector 32 is located in the outer part of the bottom polarizer 20. As shown in FIG. 2 and FIG. 3, the PDLC transflective LCD of FIG. 2 does not have an applied voltage applied to itself, but the PDLC transflective LCD of FIG. 3 has an applied voltage applied to two terminals of the PDLC transflective LCD. As shown in FIG. 3, the two terminals may be connected between the top ITO film 24 and the bottom ITO film 26.

FIG. 4 shows a schematic diagram of one embodiment of a measuring system for measuring the PDLC transflective LCDs in each of FIG. 2 and FIG. 3. As illustrated in FIG. 4, the measuring system includes two parts: one is a transmissivity measuring system for measuring a transmissivity of the PDLC transflective LCD (see FIG. 4-1), and the other is a reflectivity measuring system for measuring a reflectivity of the PDLC transflective LCD (see FIG. 4-2). Both of the two parts include a laser 100, a power supply 200, an optical detector 300, and a PDLC module 1 which sets an example of the PDLC transflective LCD. The PDLC module 1 includes the top polarizer 18, the LC layer 16, the bottom polarizer 20, the top ITO film 24 (not shown in FIG. 4), and the bottom ITO film 26 (not shown in FIG. 4). In the embodiment, the LC layer 16 is an about 4.0 micron cell gap layer, and the top polarizer 18 is parallel to the bottom polarizer 20. The laser 100 simulates the ambient light 38 (not shown in FIG. 4) to irradiate the PDLC module 1. For example, a wavelength of the ambient light 38 irradiated by the laser 10 is about 650 nm. The power supply 200 is electrically connected to the PDLC module 1 via the top ITO film 24 and the bottom ITO film 26. The power supply 200 is configured for providing the applied voltage on the PDLC module 1, for example, the power supply 200 gradually increases the applied voltage from about 0 volts to a predetermined value (e.g., 10 volts).

In FIG. 4-1, the photo detector 300 detects transmitted light passing through the PDLC module 1 after the power supply 200 applies the applied voltage on the PDLC module 1, and converts the transmitted lights into a first voltage to measure the transmissivity of the PDLC module 1. For example, if the power supply 200 performs a 10-volt applied voltage on the PDLC module 1 and the first voltage is 1 volt, the transmissivity of the PDLC module 1 is 10 percent (%).

In FIG. 4-2, the PDLC module 1 further comprises the reflector 32, and the reflectivity measuring system further comprises a spectroscope 102 and a black cardboard 104. The spectroscope 102 is configured for splitting the ambient light 38 simulated by the laser 100 into two bands: a first band of transmitted lights and a second band of reflected lights. After the black cardboard 104 absorbs the band of transmitted lights, the top polarizer 18 and the bottom polarizer 20 are equivalent to a half-wave film that can reflect the band of reflected lights four times. The photo detector 300 may detect the reflected lights and convert the reflected lights into a second voltage for measuring the reflectivity of the PDLC module 1.

Through the measuring system of FIG. 4, two conclusions may be obtained. One conclusion is that the PDLC module 1 may show a dark state if the top polarizer 18 is parallel to the bottom polarizer 20 and the PDLC module 1 in a voltage-off state, as illustrated in FIG. 2. The other conclusion is that the PDLC module 1 may show an illuminated state if the top polarizer 18 is parallel to the bottom polarizer 20 and the PDLC module 1 in a voltage-on state, as illustrated in FIG. 3.

Figure 5:
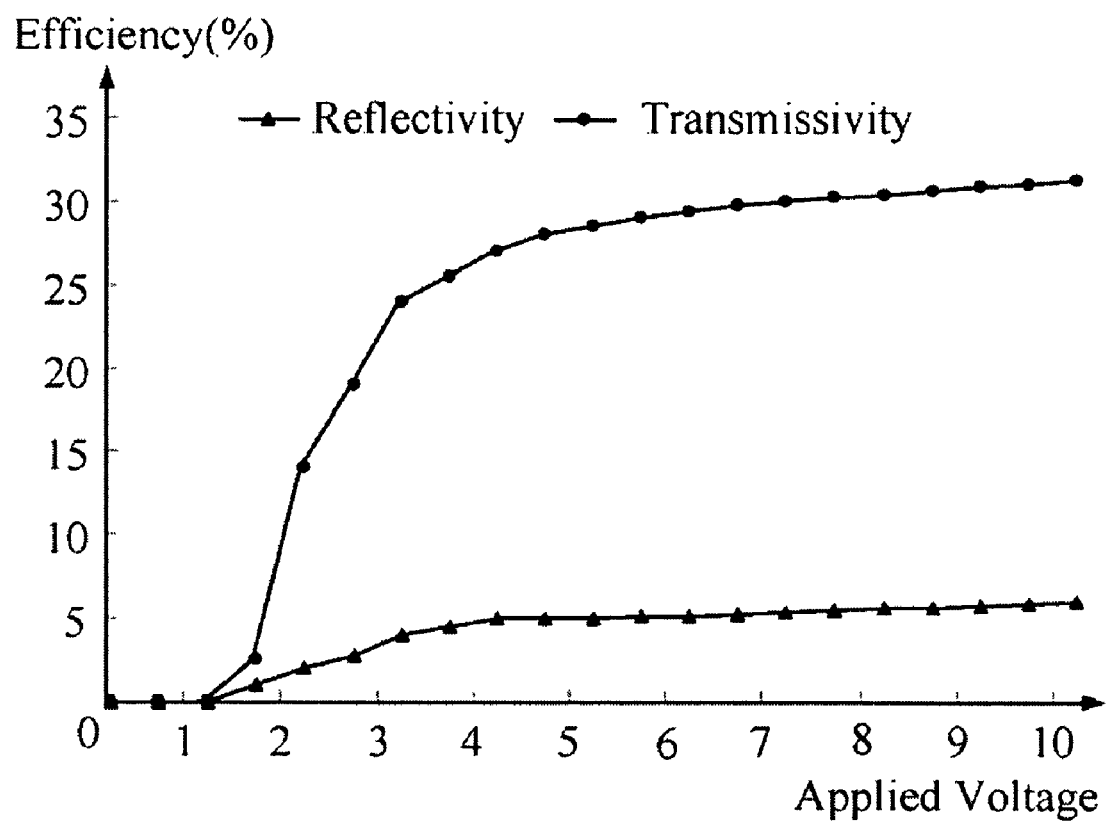
FIGS. 5 and 6 are one embodiment of graphs showing reflectance curves and transmittance curves for different applied voltages on the PDLC transflective LCD measured by the measuring system in FIG. 4.

FIG. 5 gives an example to show a reflectance curve and a transmittance curve for different applied voltages on the PDLC module 1 measured by the measuring system of FIG. 4. The reflectance curve and the transmittance curve include a loss of the ambient light 38 that is reflected by the top polarizer 18 and the bottom polarizer 20 for four times. As illustrated in FIG. 5, a mixture containing "UCL001" polymer monomers and "MJ052115" TN-LCs are prepared (weight ratio is 1:19). The thickness of the LC layer 16 in the PDLC module 1 is about 4 nm. The measuring system of FIG. 4 measures the transmissivity of the PDLC module 1 that can reach to about 32% and the reflectivity can reach to about 6%. When the applied voltage is increased to 10 volts, the transmissivity of the PDLC module 1 is still in an unsaturated condition.

Figure 6:
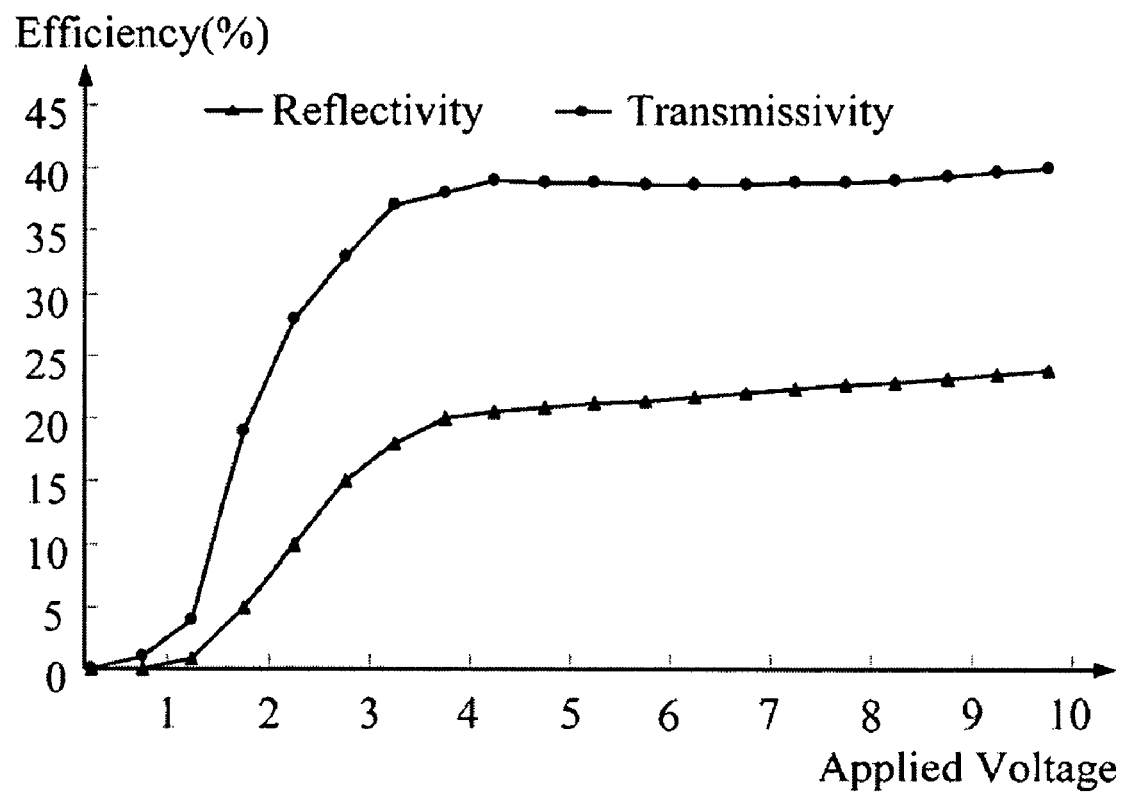

FIG. 6 gives another example of the PDLC module 1 that the mixture 14 containing "OC" polymer monomers and the "MJ052115" TN-LCs (weight ratio is 1:19). The reflectance curve and the transmittance curve in FIG. 6 include the loss of the four times' reflection. After the PDLC module 1 is measured by the measuring system of FIG. 4, the transmissivity of the PDLC module 1 can reach to about 38% and the reflectivity can reach to about 23%. When the applied voltage is about 5 volts, the transmissivity of the PDLC module 1 is in a saturated condition, namely, a saturation voltage of the transmissivity is equal to about 5 volts.

According to the examples of FIG. 5 and FIG. 6, the PDLC module 1 may have different transmissivity values and reflectivity values when the TN-LCs are mixed with different polymer monomers. If the optical scattering characteristics of the PDLC module 1 are increased, the reflectivity of the PDLC module 1 is enhanced, and the saturation voltage of the transmissivity is reduced.

With reference to FIG. 7 and FIG. 8, which show a generalized section diagram of one embodiment of the PDLC transflective LCD in the NW mode. The difference between the two figures is that the PDLC transflective LCD of FIG. 7 is without the applied voltage and the PDLC transflective LCD of FIG. 8 is with the applied voltage. As illustrated in FIG. 7 and FIG. 8, the top polarizer 18 is perpendicular to the bottom polarizer 20, and the reflector 32 is located in the inner part of the bottom polarizer 20. Thus the top polarizer 18 and the bottom polarizer 20 can generate the reflected lights by reflecting the ambient light 38 two times.

FIG. 9 shows a schematic diagram of one embodiment of the measuring system for measuring the PDLC transflective LCD in both of FIG. 7 and FIG. 8. As illustrated in FIG. 9, the structure of the PDLC module 1 is similar to the structure of the PDLC transflective LCD in FIG. 7 and FIG. 8. For example, the top polarizer 18 is perpendicular to the bottom polarizer 20 and the reflector 32 is located in the inner part of the bottom polarizer 20. The measuring system uses the transmissivity measuring system to measure the transmissivity of the PDLC module 1 (as shown in FIG. 9-1), and uses the reflectivity measuring system to measure the reflectivity of the PDLC module 1 (as shown in FIG. 9-2).

Figure 10:
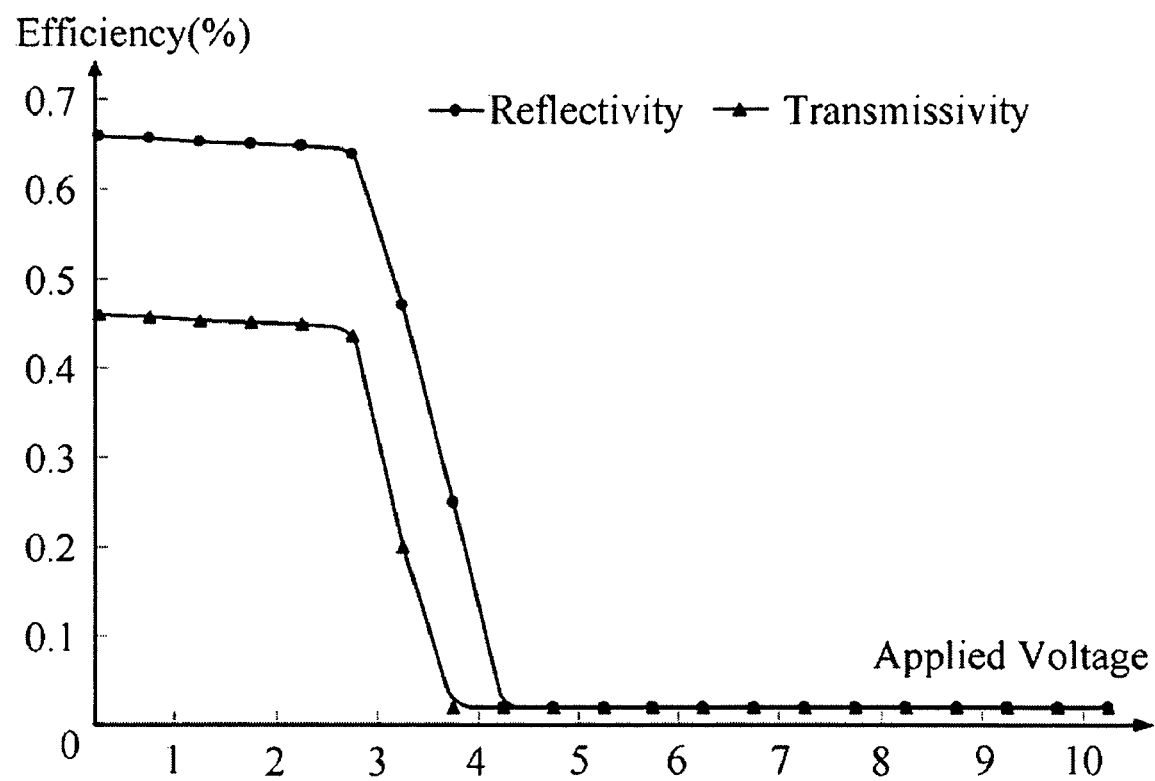
FIGS. 10, 11 and 12 are one embodiment of graphs showing reflectance curves and transmittance curves for different applied voltages on the PDLC transflective LCD measured by the measuring system in FIG. 9.
Figure 11:
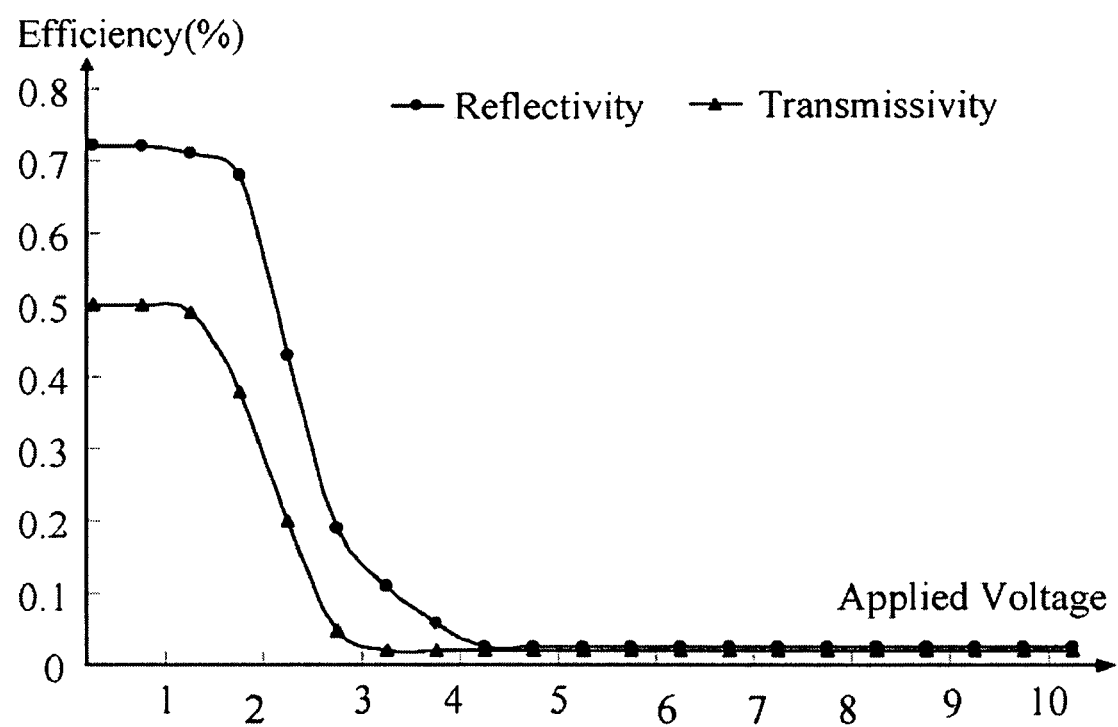
Figure 12:
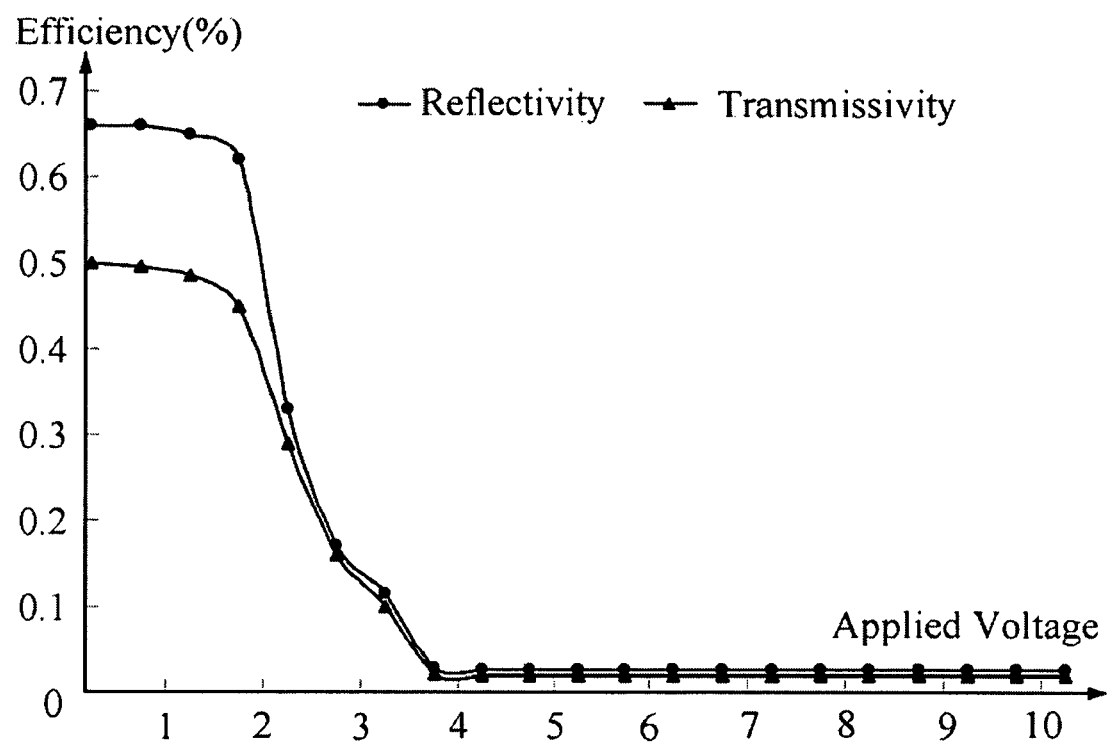

Each of FIGS. 10, 11, and 12 gives an example to show a reflectance curve and a transmittance curve for different applied voltages on the PDLC module 1 measured by the measuring system of FIG. 9. The reflectance curve and the transmittance curve do not show a loss of the ambient light 38 that is reflected by the top polarizer 18 and the bottom polarizer 20 for two times. In all of FIGS. 10, 11 and 12, the thickness of the LC layer 16 in the PDLC module 1 is about 8.9 microns, and the wavelength of the UV lights irradiating the PDLC module 1 is about 345 nm.

As illustrated in FIG. 10, a mixture containing "0C" polymer monomers and "ZAU-5160LA" TN-LCs are prepared (weight ratio is 1:19), the PDLC module 1 may show the illuminated state if the PDLC module 1 is in the voltage-off state (as shown in FIG. 8), and the PDLC module 1 may show the dark state if the PDLC module 1 is in the voltage-on state (as shown in FIG. 8). The transmissivity of the PDLC module 1 equals about 66%, the reflectivity equals about 46%, the saturation voltage of the transmissivity equals about 4 volts, and the saturation voltage of the reflectivity equals about 3.4 volts.

As illustrated in FIG. 11, a mixture containing "0C" polymer monomers and "MJ052115" TN-LCs are prepared (weight ratio is 1:19). The transmissivity of the PDLC module 1 equals about 72%, the reflectivity equals about 50%, the saturation voltage of the transmissivity equals about 2.8 volts, and the saturation voltage of the reflectivity equals about 4 volts.

As illustrated in FIG. 12, a mixture containing "UCL001" polymer monomers and "MJ052115" TN-LCs are prepared (weight ratio is 1:19). The transmissivity of the PDLC module 1 equals about 66%, the reflectivity equals about 50%, the saturation voltage of the transmissivity equals about 3.5 volts, and the saturation voltage of the reflectivity equals about 3 volts. The reflectance curve and the transmittance curve are almost coincident, and the PDLC module 1 has optical characteristics of both of the single cell gap tansflective LCD and a single gamma tansflective LCD.

According to FIG. 10, FIG. 11 and FIG. 12, one conclusion is obtained: an optical performance of the PDLC module 1 in FIG. 12 is more suitably desired.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for designing a polymer-dispersed liquid crystal (PDLC) transflective LCD construction, the method comprising:
    mixing a selected weight percentage of liquid crystal (LC) molecules and a selected weight percentage of polymer monomers to obtain a mixture, a non-chemical interaction that is generated after the polymer monomers are mixed with the LC molecules;
    injecting the mixture into an LC layer of a transflective LCD in a vacuum;
    heating the transflective LCD to a predetermined temperature;
    exposing the transflective LCD by absorbing ultraviolet (UV) lights, wherein the transflective LCD with the mixture does not need a curing voltage during the absorption of the UV lights;
    performing a photo polymerization on the transflective LCD by using a reflector of the transflective LCD that reflects the UV lights onto the LC layer of the transflective LCD; and
    phase separating the LC layer to generate a PDLC layer, and forming a PDLC transflective LCD by the PDLC layer with the transflective LCD.

2. The method of claim 1, wherein the selected weight percentage of the polymer monomers is between about 3 wt % to about 5 wt %.

3. The method of claim 1, wherein the LC molecules are twisted nematic LCs.

4. The method of claim 1, wherein the PDLC transflective LCD is a single cell gap transflective LCD.

5. The method of claim 1, wherein the polymer monomers comprise:
    a refractive index of the polymer monomers that is different from a refractive index of the LC molecules; and
    capable of being separated from the LC molecules after the transflective LCD absorbs the UV lights.

6. The method of claim 1, wherein the predetermined temperature is about 60 degrees centigrade.

7. The method of claim 1, wherein a time of the exposure of transflective LCD is about fifteen minutes.

8. The method of claim 1, wherein the UV lights are unpolarized lights, a wavelength of each of the UV lights is between about 345 nanometers to about 365 nanometers, and an optical intensity of each of the UV lights is between about 3.5 mW/cm2 to about 12 mW/cm2.

9. A polymer-dispersed liquid crystal (PDLC) transflective LCD, comprising:
    a transflective LCD comprising an LC layer and a reflector, wherein the reflector is configured for performing a photo polymerization on the transflective LCD;
    a mixture injected in the LC layer of the transflective LCD in a vacuum, wherein the mixture is obtained by mixing a selected weight percentage of liquid crystal (LC) molecules and a selected weight percentage of polymer monomers, a non-chemical interaction that is generated after the polymer monomers are mixed with the LC molecules;
    a PDLC layer that is generated by heating the transflective LCD to a predetermined temperature, by exposing the transflective LCD using absorbed ultraviolet (UV)

lights, and by phase separating the LC layer of the transflective LCD, wherein the transflective LCD with the mixture does not need a curing voltage during the absorption of the UV lights; and wherein the PDLC layer with the transflective LCD is configured to form the PDLC transflective LCD.

10. The PDLC transflective LCD of claim 9, wherein the selected weight percentage of the polymer monomers is between about 3 wt % to about 5 wt %.

11. The PDLC transflective LCD of claim 9, wherein the LC molecules are twisted nematic LCs.

12. The PDLC transflective LCD of claim 9, wherein the PDLC transflective LCD is a single cell gap transflective LCD.

13. The PDLC transflective LCD of claim 9, wherein the polymer monomers comprise:

a refractive index of the polymer monomers that is different from a refractive index of the LC molecules; and capable of being separated from the LC molecules after the transflective LCD absorbs the UV lights.

14. The PDLC transflective LCD of claim 9, wherein the predetermined temperature is about 60 degrees centigrade.

15. The PDLC transflective LCD of claim 9, wherein a time of the exposure of transflective LCD is about fifteen minutes.

16. The PDLC transflective LCD of claim 9, wherein the UV lights are unpolarized lights, a wavelength of each of the UV lights is between about 345 nanometers to about 365 nanometers, and an optical intensity of each of the UV lights is between about 3.5 mW/cm2 to about 12 mW/cm2.

17. The PDLC transflective LCD of claim 9, further comprising a top polarizer, and a bottom polarizer.

18. The PDLC transflective LCD of claim 17, wherein the reflector is installed in a lateral side of the bottom polarizer.

19. The PDLC transflective LCD of claim 17, wherein the PDLC transflective LCD is in a normal black mode if the top polarizer is parallel to the bottom polarizer.

20. The PDLC transflective LCD of claim 17, wherein the PDLC transflective LCD is in a normal white mode if the top polarizer is perpendicular to the bottom polarizer.

* * * * *